Patented July 16, 1935

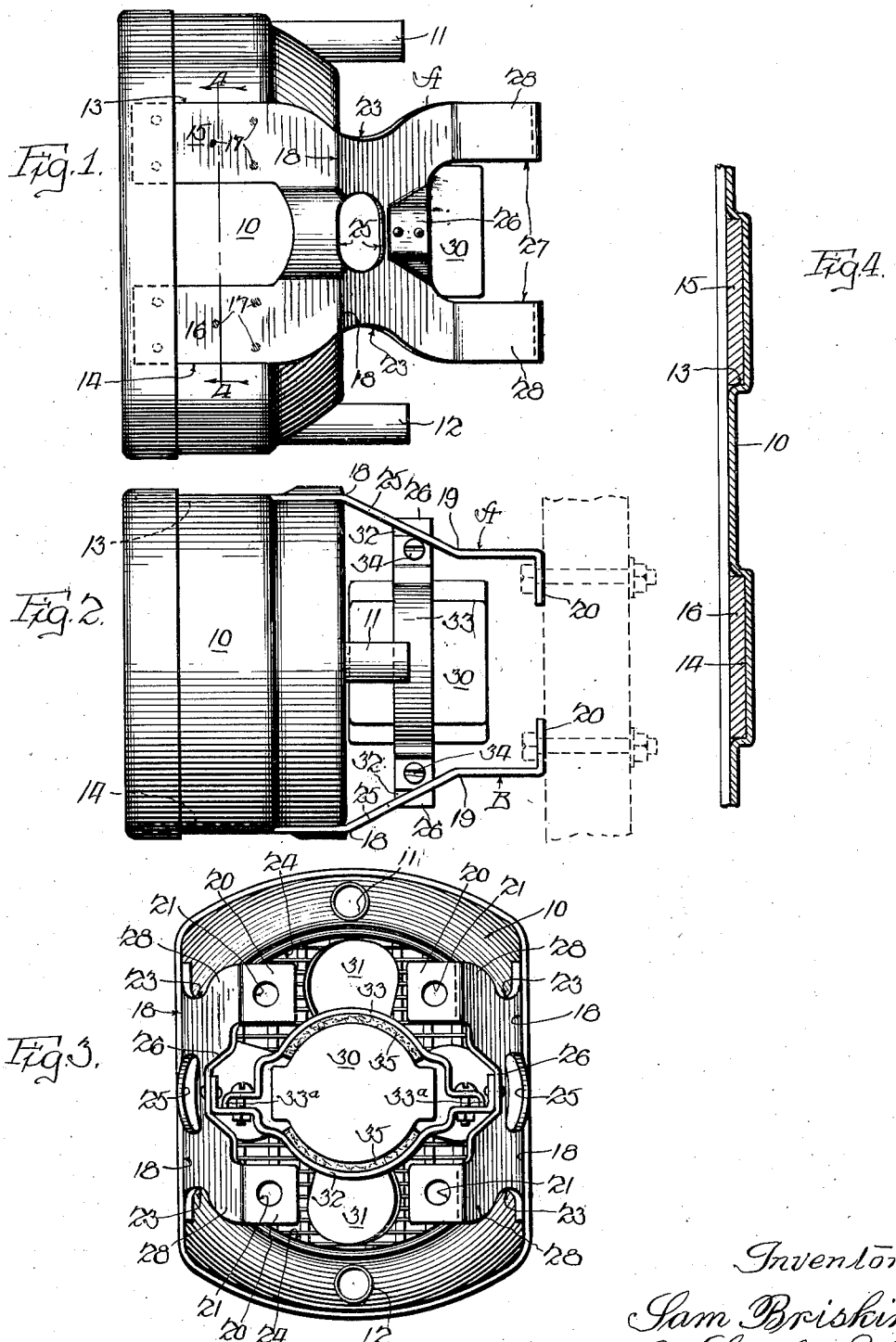

2,007,998

UNITED STATES PATENT OFFICE 2,007,998

SUPPORTING MEANS

Sam Briskin, Chicago, Ill.

Application October 16, 1933, Serial No. 693,693

2 Claims. (Cl. 248—2)

The present invention relates to supporting means more particularly for automobile heater units or the like.

Units of the general character of the one herein disclosed are well known as attachments to an automobile for heating the interior of the tonneau, and the present construction presents nothing new in the organization of a hollow mesh-work type of heat-radiating core, means for connecting the hollow interior thereof with the water-circulating system of the internal combustion engine, a motor, and a fan driven thereby for forcing air through the mesh-work openings of the core, and some kind of means for holding the unit in place.

Devices of this kind are usually mounted in an automobile beneath the instrument panel and upon the vertical board partition that divides the passenger compartment from that containing the engine. Some difficulties arise in properly or advantageously locating such a device because of the presence of apparatus or obstructions on one or both sides of that partition. I have provided a bracket construction for the unit that peculiarly lends itself to proper application in otherwise difficult situations.

Other objections to such devices have been the vibration and noise incident to operating the motor and fan. Such vibration is communicated to the floor on which the driver or passenger has his feet. It also produces an objectionable hum, both from the unit and associated parts vibrating at their fundamental rates. I have herein shown a unit-mounting structure that holds the unit body free of vibrations of objectionable amplitude and overcomes the objection of unnecessary noise.

A further object is to accomplish these results by simple and low-cost means, easily to be made and assembled, and being strong and durable. Other objects and advantages will appear hereinafter.

In the drawing Figure 1 is a side elevational view of the unit complete;

Fig. 2 is a top plan view thereof;

Fig. 3 is a rear elevational view of the device; and

Fig. 4 is an enlarged sectional view through the shell and either one of the bracket members.

The annular shell 10 is to be understood as encompassing a plate-like, hollow, mesh-work type of core which in all substantial respects is like the ordinary radiator, say, for example, about six inches by eight inches in face view. The two short pipe sections 11 and 12 are to be understood as being in communication with the hollow interior with the headers respectively of that core, and, in practice, rubber tubing is connected to the pipe sections 11 and 12 and a water circuit is thus completed with the water-circulating system that cools the engine. This core and its immediate connections constitute a heater proper. The present invention brings nothing new into the art in that regard. It is old also to provide around the core a shell of pressed sheet metal, similar to shell 10, as its supporting frame. The core and the shell may be considered the body of the device.

In connection with shell 10 I provide a feature of novelty in a pair of shallow indentations 13 and 14, providing flat seats in each normally vertical opposite flat circumferential side of the shell, and which seats of each pair are spaced apart vertically a substantial distance. These seats accommodate what I shall call the inner end portions 15 and 16 of the bracket members, which are flat tongue-like parts, and fit into these recessed seats, and these bracket parts are therefore also spaced apart such substantial distance.

The results of such indentation of the metal of the shell are, first, to provide for the frame or shell as a whole an unusual rigidity, and, secondly, to render its side members so firm that, taken with the bracket construction, there can be no substantial vibration of the body independently of that of the bracket members. The bracket members are rigidly secured to the shell in such seats preferably by spot-welding at numerous places marked 17. Note that the bracket members have their substantially flat side surfaces in substantially vertical planes, and the bracket members are substantially wide in the up-and-down directions. It may be pointed out that a device of this kind is subjected not only to its own motor vibration but to that of the vehicle, and that the substantially heavy body of the device extends away from the supporting partition in the car a considerable distance.

The two bracket members, marked A and B are alike in all material respects and will otherwise be given the same reference characters. As clearly shown in Fig. 1, they are each bifurcated at each end forming the appearance of an H. From the place where they are secured to the shell they are formed to extend inwardly, toward the central axis of the device, and rearwardly, or away from the body. This first change of direction occurs at bend 18, and then at bend 19 the direction changes to rearward. At their free ends the brackets are turned over to provide resting seats or feet 20 which normally contact the support on which the device is mounted, namely the partition at the front end of the tonneau, and these feet are provided with holes 21 for bolts. The feet 20 are thus at the corner of a substantially rectangular area which is considerably smaller than the general area of the shell projected upon the plane of these feet. In the up-and-down directions the feet are shown as defining the full width of the bracket member where it is secured to the shell, and the bolts of each pair are widely spaced vertically, thus providing strong leverage effects in the up-and-down directions when the bolts hold the device as a whole in place.

The bracket members are formed so that the seats 20 and the holding means therewith are in substantially vertical planes which are inward of the parallel planes passing through the bracket parts affixed to the shell, which planes are parallel also to the axis of the device. One reason for such forming is to strengthen the bracket members, and another is to get the holding means, as bolts, in a fairly restricted area. Owing to obstructions of various kinds the installation of such devices where desired is often attended by difficulty. One problem which I have thus overcome was how to hold the body and the motor as strongly as desired while maintaining the base (the feet as 20) of such size and proportions as to overcome such difficulties.

The curved recesses 23 in the side edge portions of the bracket members are to provide clearance for air to enter the large opening 24 in the shell, and the substantially large hole 25 through the bracket member is for that purpose also, as well as lightening the structure without material diminution in strength. A bracket member as wide generally as the ones shown would prevent the free flow of air to the fan, hence special provisions are made for avoiding such objection without sacrificing the desired strength. Furthermore, the construction just mentioned is for the additional purpose of providing the bracket with resiliency for overcoming objectionable vibration effects.

At 26 integral metal of the bracket member forms a cross-piece partly defined by hole 25 and otherwise by the recess-like opening 27 establishing the upper and lower legs 28. These legs 28 are resilient in horizontal directions while rigid in vertical directions. The cross piece 26 is strengthened by pressing the metal out as shown. The legs 28 effectively extend to the bend 18, through the provision of hole 25.

The motor 30, of any approved form, has a fan 31 on its driving shaft, as usual in this art. The motor is held by two strap-like members 32 and 33. Strap 32 is bent over at its ends and secured rigidly, as by rivets, to the opposite cross-pieces 26. Strap 33 has its free ends bent over at 33a to serve as fulcrums, while bolts 34 draw the strap tightly. These straps pass around the motor and cushioning material 35. I find cork, for strips 35, to give better results than the kinds ordinarily used. The motor is thus swung between the two bracket members and from the resilient legs thereof. The vibration of the motor is thus absorbed or neutralized. At the same time the motor holding means constitute a strut between the two bracket members, at about the middle thereof, and thus the bracket as a whole is made a very strong and rigid structure.

By these means I have accomplished the important results of a very quietly-running device, free of all vibration but such of low and unobjectionable amplitude, and at the same time have provided an unusually strong and serviceable construction well able to withstand the severe shocks of vehicle vibration, as when on a rough road, and yet the construction is capable of being manufactured at ordinary costs.

Some departures may be made from the specific construction shown without departing from the invention hereof, and the appended claims are intended to include such departures.

I claim:—

1. A supporting means for an automobile heater having a shell of pressed metal, comprising a pair of sheet-metal vertically substantially wide H-shape bracket members extending rearward from and each having a pair of legs secured rigidly to the shell on the opposite and substantially vertical sides thereof, each bracket member being formed to converge rearwardly at the cross piece of the H toward the other thereof to a substantial extent and each having another pair of legs having means at their respective free ends for securing them to a support, said legs being substantially wide vertically, and their free ends defining the corners of a substantially rectangular area which is relatively small compared with the area of said shell projected upon the plane of said free ends, and strut means secured to the brackets at their said cross pieces respectively for reinforcement and also for supporting a motor between said bracket members.

2. A bracket member of the character described comprising a substantially wide piece of H-shaped sheet-metal formed at its normally inner end portion to fit upon the annular surface of a shell of the character described and to be secured rigidly thereto at widely spaced-apart portions thereof, said member having a pair of substantially long integral legs the free ends of which are turned over substantially on a common plane to provide seating rest surfaces, there being a substantially large air opening through the member near the place where the member is adapted to be secured to such shell, with integral metal extending between said legs and partly defining said opening and being formed as a seat for holding motor-supporting means, said member being formed to provide that said legs and said last-mentioned seat are normally in vertical planes spaced a substantial distance from a parallel plane passing through other end portions of the member.

SAM BRISKIN.